United States Patent Office 2,987,400
Patented June 6, 1961

2,987,400
NEUTRAL-TYPE INSTANT CHIFFON PIE FILLING AND METHOD OF PRODUCING SAME
Austin R. Hunter, La Mesa, Calif., assignor to Kelco Company, San Diego, Calif., a corporation of Delaware
No Drawing. Filed Dec. 30, 1958, Ser. No. 783,666
25 Claims. (Cl. 99—139)

This invention relates to chiffon pie fillings and, more particularly, to an alginate composition additive for making instant cold, neutral-type chiffon pie fillings.

In the past, chiffon pie fillings have been made from gelatin mixtures. Gelatin in such a mixture requires the use of hot water or hot milk to dissolve the mixture before it can be whipped. Thus, after the mixture is dissolved, it is whipped so as to create a flavored and colored foamed product that will retain its shape. The requirement that the gelatin be dissolved in hot liquid prevents such a mixture from being a true instant chiffon pie filling composition.

Previous attempts have been made to find a substitute for gelatin, but they have been unsuccessful. These prior art attempts did not produce a satisfactory foam and, further, the foam thus made did not retain its original shape for a long enough period, such as a few days.

In the prior art, so far as I am aware, no gelatinizing agent has been successfully used in cold water along with a whipping agent to form instant neutral-type chiffon pie filling. According to the present invention, a highly satisfactory and desirable chiffon pie filling may be prepared by adding cold water to a composition comprising a low calcium ash water-soluble alkali alginate, a whipping agent and milk solids or other source of available calcium ions.

In the present invention, I have developed a stable foamed product and a method of producing the same by utilizing a whipping agent to produce the foam and then stabilizing the foam by creating a gel system therein that maintains the foam structure at room temperature at which it may be made. After the foamed pie filling has been formed, it need not be put under refrigeration, but it is generally desirable to do so in that this type of dessert is usually served chilled.

It has now been surprisingly found that the foregoing disadvantages of a hot type gelatin mixture can be overcome and a highly desirable instant neutral-type chiffon pie filling composition can be prepared by mixing a combination of a low calcium ash water-soluble alginate, such as a sodium alginate containing not more than 1.0% of calcium oxide; a whipping agent, such as soybean protein; and a calcium source, such as nonfat milk solids, with cold water.

Such a neutral-type chiffon pie filling can be flavored with any number of different flavors, such as anise, licorice, date, black walnut, rum, brown sugar, coconut, root beer, vanilla, almond, raisin, cinnamon, ginger, various mints, maple, maple nut, coffee, banana, butterscotch, chocolate and peanut butter.

In developing a neutral-type filling, I have found that it was difficult to formulate an acidic mechanism to set the gel and yet have a neutral end product. However, according to the invention, it was found that instant nonfat milk solids could be used to set the gel, the alginate dissolving before the soluble calcium from the milk solids began to form the gel with the alginate.

My invention presents considerable advantages over what has been provided in the prior art. Firstly, cold water may be used instead of hot water. This makes a true instant chiffon pie filling possible as it not only does not require the conventional heating of the water but eliminates the need for removing the added heat thereafter. Thus, since the filling requires no cooling, after being whipped it sets and can be eaten in a matter of several minutes. Further, all the ingredients can be added to the water at the same time.

In contrast to the prior art, my invention requires the use of only a low calcium ash alginate, a whipping agent and milk solids to make an instant chiffon pie filling when they are mixed with cold water. The requirement for only three ingredients is made possible by my surprising discovery that a low calcium ash sodium alginate containing not more than 1.0% of calcium oxide, in amounts depending upon its viscosity, produces the proper body to the foamed mixture. Further, the foam thus formed in a desirable creamy condition will not change markedly on storage. According to my invention, sodium alginate is preferred, but low calcium ash potassium and ammonium alginates may also be used. If the calcium ash content is greater than 1.0%, other elements are required to make a good instant chiffon pie filling. The water-soluble alginates, such as low calcium ash sodium alginate, suitable for use in accordance with my invention may be prepared by any of the well-known methods such as disclosed in the following U.S. patents: 1,814,981, Thornley and Walsh, July 14, 1931; 2,036,922, Clark and Green, April 7, 1936; 2,036,934, Green, April 7, 1936; 2,128,551, LeGloahec, August 30, 1938; but preferably by 2,477,861, Clark and Steiner, November 28, 1945.

It is therefore an object of the present invention to provide a neutral-type instant cold chiffon pie filling and a method of making the product.

To make it possible to aerate or foam the mixture, including the water, by whipping and thus provide the chiffon effect, an edible whipping agent, such as egg whites, sodium caseinate or soybean protein, alone or in combination, is employed. In practicing my invention, I have found that the preferred whipping agent is soybean protein and desirable results have been obtained therewith when used at ½ to 1% by weight of the total weight of the finished filling.

The alginate is caused to gel in the water by supplying calcium ions available in milk solids. These ions react with the alginate and form the desired calcium alginate gel. In preparing neutral chiffon pie fillings, according to the present invention, it has been found that the calcium ions in milk solids form an unusually good gel and stable foam body when they react with the dissolved alginate. I have also found that it is possible to utilize other soluble or partially soluble calcium compounds, such as calcium citrate, calcium tartrate, calcium gluconate, calcium lactate, calcium benzoate, calcium acetate and mono-calcium phosphate, either with or in place of the skim milk solids to achieve special properties that might be desired in a gel. When the calcium salts are used in place of milk solids, an all vegetable product can be produced.

When a low viscosity sodium alginate is used, a greater quantity thereof is necessary to produce the proper body and gel characteristics for good filling properties than is required for a high viscosity sodium alginate. For example, a low viscosity sodium alginate may require up to twice the amount of a high viscosity alginate with at least a corresponding increase in the amount of the available calcium ions. Thus, it is preferable to use a high viscosity sodium alginate so as to use less in a mixture for economic reasons. By way of definition, a high viscosity sodium alginate as used in this invention is one which has a viscosity in the range of 400 centipoises for a 1% as in water solution, and a low viscosity sodium alginate is one in the range of about 20 centipoises for the same percentage solution. It has also been found that it is preferable to use a fine mesh sodium alginate which passes through 100 mesh U.S. Standard screen so that the alginate will go into solution in a short mixing time.

As a preferred method, it is desirable that the availability of calcium ions be delayed from reacting with the alginate until it has dissolved, the latter occurring in a very few minutes. Delaying the availability of the calcium ions may be accomplished by use of a buffering or sequestering agent. In general terms, the sequestering agent may be any edible soluble salt or an acid of which the calcium salt is substantially insoluble or undissociated in water and in which the cation does not precipitate the alginate. I have found sodium hexametaphosphate to be the preferred sequestering agent in the present invention, but others, such as trisodium phosphate, disodium phosphate, tetrasodium pyrophosphate, sodium tripolyphosphate, tripotassium phosphate, tetrapotassium pyrophosphate and potassium tripolyphosphate, may be used.

The following examples will serve to illustrate the formulations of satisfactory instant neutral-type chiffon pie fillings:

*Example 1*

A neutral chiffon pie filling can be produced using various calcium sources with different degrees of success. The following is a satisfactory filling formulation of this kind, using instant skim milk powder as the calcium source:

|  | Gm. | Percent |
| --- | --- | --- |
| Sodium alginate (containing not more than 1.0% of calcium oxide) | 2.5 | 4.55 |
| Skim milk powder, instant | 10.0 | 18.20 |
| Whipping agent | 2.5 | 4.55 |
| Sugar | 40.0 | 72.70 |
|  | 55.0 | 100.00 |

Mixing procedure: Whip 55 gms. of the ingredients in Example 1 into one cup of water. Then add ⅓ of a cup additional sugar after one minute. Whip 3 minutes total.

Calcium citrate can be used between the ranges of 0.5 and 4.5 grams in the above formulation instead of skim milk powder, but best results are obtained between 1.25 and 2.0 grams. Calcium gluconate can be used at from 0.25 to 1.25 grams, but 0.5 to 0.75 grams gives best results. The calcium lactate level is more critical but can be used in amounts of 0.1 to 0.4 grams; however, the range of 0.25 to 0.30 produces the best results. Calcium tartrate was found to be satisfactory at 4.0 grams, monocalcium phosphate at 1.0 grams, and calcium benzoate at 0.30 grams in the above formulation.

Skim milk powder is the preferred calcium source in these fillings because of the wholesome, nourishing features of this natural food product and because of the added body and desirable eating properties that it provides.

*Example 2*

The use of chocolate as a flavor, a favorite of a great number of people, presented the problem of maintaining as well as producing sufficient foam in a satisfactory chiffon pie filling in that its fat content tends to inhibit or destroy the foam. I have found that the use of milk solids assisted the foam formation and that a sufficient amount of whipping agent insured a satisfactory volume of foam. A preferred formulation for an instant cold-water chocolate chiffon pie filling is as follows:

|  | Percent |
| --- | --- |
| Sodium alginate (containing not more than 1.0% of calcium oxide) | 2.06 |
| Sodium hexametaphosphate | 0.33 |
| Whipping agent | 2.47 |
| Sodium chloride | 0.33 |
| Nonfat milk solids | 20.30 |
| Cocoa | 8.24 |
| Sugar | 66.27 |
|  | 100.00 |

A filling may be made from the above dry ingredients after they have been blended thoroughly by adding 4.25 ounces of the dry powdered mix to one cup of cold water while stirring at high speed. The mixture then should be whipped from 3 to 5 minutes to obtain maximum volume and a filling that will form stable peaks. This whipped mixture may be then placed in a previously baked pie shell after which it may be decorated and refrigerated as desired. The setting time for the filling is short, and the pie is ready to eat in about thirty minutes or when chilled.

*Example 3*

Most flavors, other than chocolate, do not need such a high level of whipping agent and, when they are to be used, it can be reduced by about 15 or more percent and still produce a satisfactory foam. A typical basic filling formulation to which almost any neutral flavoring agent could be added is as follows:

|  | Percent |
| --- | --- |
| Sodium alginate (containing not more than 1.0% of calcium oxide) | 2.25 |
| Sodium hexametaphosphate | 0.45 |
| Whipping agent | 2.25 |
| Sodium chloride | 0.35 |
| Nonfat milk solids | 22.50 |
| Sugar | 72.20 |
|  | 100.00 |

The above dry blended formulation may be flavored and colored as desired. To complete the filling, four ounces of the above mixture should be whipped at high speed as it is poured into one cup of cold water. After all the mixture is in the water, whipping should be continued for 2 to 3 minutes to obtain the desired volume. When the whipping has been completed, it is ready to be inserted into a prepared pie shell and refrigerated.

Improved formulations, illustrated in Examples 4 and 5, were developed to give faster whip, better body and faster setting time by increasing the level of sodium alginate and using a combination of dry skim milk solids and calcium lactate as the setting agent.

*Example 4—Chocolate Flavored*

|  | Gm. | Percent |
| --- | --- | --- |
| Sodium alginate (containing not more than 1.0% of calcium oxide) | 2.75 | 3.38 |
| Sodium hexametaphosphate | 0.30 | 0.37 |
| Calcium lactate (N.F. powdered) | 0.20 | 0.25 |
| Whipping agent | 3.00 | 3.70 |
| Skim milk powder (Carnation Instant) | 25.00 | 30.00 |
| Sugar | 40.00 | 50.00 |
| Cocoa | 10.00 | 12.30 |
|  | 81.25 | 100.00 |

Whip 81.25 gms. of the above powdered mix into one cup of cold water for one minute; then add ⅓ cup additional sugar and continue whipping until peaks form.

Example 5—Vanilla flavored

| | Gm. | Percent |
|---|---|---|
| Sodium alginate (containing not more than 1.0% of calcium oxide) | 2.75 | 3.90 |
| Sodium hexametaphosphate | 0.30 | 0.42 |
| Calcium lactate (N.F. powdered) | 0.20 | 0.28 |
| Whipping agent | 2.50 | 3.55 |
| Skim milk powder | 25.00 | 35.00 |
| Sugar | 40.00 | 56.50 |
| Vanillin | 0.25 | 0.35 |
| | 71.00 | 100.00 |

Whip 71.00 grams of the ingredients in Example 5 into one cup of cold water, following procedure in Example 4.

Sweetness is controlled by the amount of sugar used and can be altered to suit individual preferences; however, some added body is obtained when higher levels of sugar are used.

Example 6—Fresh milk

A neutral type chiffon filling was also made using essentially the same procedure as set forth in the foregoing example, but replacing the one cup water with one cup whole or skim milk, and ⅓ of a cup of additional sugar if not included in the packaged mix. Somewhat less overrun was obtained than with skim milk powder. The following ingredients were used for each cup of fresh milk:

| | Gm. |
|---|---|
| Sodium alginate (containing not more than 1.0% of calcium oxide) | 2.50 |
| Trisodium phosphate | 0.75 |
| Calcium citrate | 2.00 |
| Sodium chloride | 0.40 |
| Vanillin | 0.30 |
| Whipping agent | 2.50 |
| Sugar | 40.00 |
| | 48.45 |

It is understood that the examples are given by way of illustration only and are not to be considered as a limitation on the scope of the invention as defined in the appended claims.

What is claimed is:

1. A new and useful composition suitable for producing an instant cold, neutral-type chiffon pie filling comprising: 1.5 to 6 parts by weight of a water-soluble alginate containing not more than 1.0% of calcium oxide selected from the group consisting of sodium alginate, potassium alginate and ammonium alginate; 1 to 5 parts by weight of a whipping agent selected from the group consisting of egg whites, sodium caseinate and soybean protein; and a source of calcium ions sufficient to produce a calcium alginate gel in an amount from 1/10 to 40 parts by weight of said source of calcium ions selected from the group consisting of dry milk solids, calcium citrate, calcium tartrate, calcium gluconate, calcium lactate, calcium benzoate, mono-calcium phosphate and calcium acetate.

2. A new and useful composition for producing a cold, instant neutral-type chiffon pie filling comprising: 1.5 to 6 parts by weight of a water-soluble alkali alginate, said alginate containing not more than 1.0% of calcium oxide; 0 to 1 part by weight of a sequestering agent selected from the group consisting of sodium hexametaphosphate, trisodium phosphate, disodium phosphate, tetrasodium pyrophosphate, sodium tripolyphosphate, tripotassium phosphate, tetrapotassium pyrophosphate and potassium tripolyphosphate; 1 to 5 parts by weight of a whipping agent selected from the group consisting of egg whites, sodium caseinate and soybean protein; and 10 to 40 parts by weight of dry milk solids.

3. A new and useful cold, instant neutral-type chiffon pie filling composition comprising the following ingredients by weight percent:

| | |
|---|---|
| Sodium alginate (containing not more than 1.0% of calcium oxide) | 4.55 |
| Skim milk powder, instant | 18.20 |
| Whipping agent | 4.55 |
| Sugar | 72.70 |

4. A new and useful composition suitable for producing a cold, instant neutral-type chiffon pie filling comprising: 2.5 parts by weight of a sodium alginate, said alginate containing not more than 1.0% of calcium oxide; 0.5 to 4.5 parts by weight of calcium citrate; and 2.5 parts by weight of a whipping agent.

5. A new and useful composition suitable for producing a cold, instant neutral-type chiffon pie filling comprising: 2.5 parts by weight of a sodium alginate, said alginate containing not more than 1.0% of calcium oxide; 0.25 to 1.25 parts by weight of calcium gluconate; and 2.5 parts by weight of a whipping agent.

6. A new and useful composition suitable for producing a cold, instant neutral-type chiffon pie filling comprising: 2.5 parts by weight of a sodium alginate, said alginate containing not more than 1.0% of calcium oxide; 0.1 to 0.4 part by weight of calcium lactate; and 2.5 parts by weight of a whipping agent.

7. A new and useful composition suitable for producing a cold, instant neutral-type chiffon pie filling comprising: 2.5 parts by weight of a sodium alginate, said alginate containing not more than 1.0% of calcium oxide; 4.0 parts by weight of calcium tartrate; and 2.5 parts by weight of a whipping agent.

8. A new and useful composition suitable for producing a cold, instant neutral-type chiffon pie filling comprising: 2.5 parts by weight of a sodium alginate, said alginate containing not more than 1.0% of calcium oxide; 0.3 part by weight of calcium benzoate; and 2.5 parts by weight of a whipping agent.

9. A new and useful cold, instant neutral-type chiffon pie filling composition comprising the following ingredients by weight percent:

| | |
|---|---|
| Sodium alginate (containing not more than 1.0% of calcium oxide) | 2.06 |
| Sodium hexametaphosphate | 0.33 |
| Whipping agent | 2.47 |
| Sodium chloride | 0.33 |
| Nonfat milk solids | 20.30 |
| Cocoa | 8.24 |
| Sugar | 66.27 |

10. A new and useful composition suitable for producing a cold, instant neutral-type chiffon pie filling comprising the following ingredients by weight percent:

| | |
|---|---|
| Sodium alginate (containing not more than 1.0% of calcium oxide) | 2.25 |
| Sodium hexametaphosphate | 0.45 |
| Whipping agent | 2.25 |
| Sodium chloride | 0.35 |
| Nonfat milk solids | 22.50 |
| Sugar | 72.20 |

11. A new and useful composition suitable for producing a cold, instant neutral-type chiffon pie filling comprising: 2.06 to 2.25 parts by weight of a sodium alginate, said alginate containing not more than 1.0% of calcium oxide; 0.33 to 0.45 part by weight of sodium hexametaphosphate; 2.25 to 2.47 parts by weight of soybean whipping agent; and 20.30 to 22.50 parts by weight of nonfat milk solids.

12. A new and useful cold, instant neutral-type chiffon pie filling composition comprising the following ingredients by weight percent:

| | |
|---|---|
| Sodium alginate (containing not more than 1.0% of calcium oxide) | 3.38 |
| Sodium hexametaphosphate | 0.37 |

| Calcium lactate | 0.25 |
| --- | --- |
| Whipping agent | 3.70 |
| Skim milk powder, instant | 30.00 |
| Sugar | 50.00 |
| Cocoa | 12.30 |

13. A new and useful cold, instant neutral-type chiffon pie filling composition comprising the following ingredients by weight percent:

| Sodium alginate (containing not more than 1.0% of calcium oxide) | 3.90 |
| --- | --- |
| Sodium hexametaphosphate | 0.42 |
| Calcium lactate | 0.28 |
| Whipping agent | 3.55 |
| Skim milk powder | 35.00 |
| Sugar | 56.50 |
| Vanillin | 0.35 |

14. A new and useful cold, fresh milk, instant neutral-type chiffon pie filling composition comprising the following ingredients in amounts in grams for mixing with one cup of fresh milk:

| Sodium alginate (containing not more than 1.0% of calcium oxide) | 2.50 |
| --- | --- |
| Trisodium phosphate | 0.75 |
| Calcium citrate | 2.00 |
| Sodium chloride | 0.40 |
| Vanillin | 0.30 |
| Whipping agent | 2.50 |
| Sugar | 40.00 |

15. A method of producing an instant cold, neutral-type chiffon pie filling composition comprising: admixing 1.5 to 6 parts by weight of a water-soluble alkali alginate, said alginate containing not more than 1.0% of calcium oxide; 0 to 1 part by weight of a sequestering agent selected from the group consisting of sodium hexametaphosphate, trisodium phosphate, disodium phosphate, tetrasodium pyrophosphate, sodium tripolyphosphate, tripotassium phosphate, tetrapotassium pyrophosphate and potassium tripolyphosphate; 1 to 5 parts by weight of a whipping agent selected from the group consisting of egg white, sodium caseinate and soybean protein; and 10 to 40 parts by weight of nonfat milk solids.

16. The invention according to claim 15 including the step of introducing said mixture into the desired quantity of cold water.

17. A method of producing an instant cold, neutral-type chiffon pie filling comprising: admixing the following materials in the amounts set forth in parts by weight with the amount of water to obtain the desired gel:

| Sodium alginate (containing not more than 1.0% of calcium oxide) | 2.50 |
| --- | --- |
| Skim milk powder | 10.00 |
| Whipping agent | 2.50 |

18. A method of producing an instant cold, neutral-type chiffon pie filling comprising: admixing the following materials in the amounts set forth in parts by weight with the amount of water to obtain the desired gel:

| Sodium alginate (containing not more than 1.0% of calcium oxide) | 2.06 |
| --- | --- |
| Sodium hexametaphosphate | 0.33 |
| Whipping agent | 2.47 |
| Dry milk solids | 20.30 |

19. A method of producing an instant cold, neutral-type chiffon pie filling comprising: admixing approximately 4.25 ounces of the following materials with water in the amounts set forth by weight percent for each cup of water so employed:

| Sodium alginate (containing not more than 1.0% of calcium oxide) | 2.06 |
| --- | --- |
| Sodium hexametaphosphate | 0.33 |
| Whipping agent | 2.47 |
| Sodium chloride | 0.33 |
| Nonfat milk solids | 20.30 |
| Cocoa | 8.24 |
| Sugar | 66.27 |

20. A method of producing an instant, cold, neutral-type chiffon pie filling comprising: admixing approximately 55 grams of the following materials with water in the amounts set forth in parts by weight for each cup of water so employed:

| Sodium alginate (containing not more than 1.0% of calcium oxide) | 2.50 |
| --- | --- |
| Skim milk powder, instant | 10.00 |
| Whipping agent | 2.50 |
| Sugar | 40.00 | whipping the mixture for approximately one minute, adding approximately ⅓ of a cup of additional sugar; and further whipping said mixture until peaks are formed.

21. A method of producing an instant cold, neutral-type chiffon pie filling comprising: admixing the following materials in the amounts set forth in parts by weight with the amount of water to obtain the desired gel:

| Sodium alginate (containing not more than 1.0% of calcium oxide) | 2.25 |
| --- | --- |
| Sodium hexametaphosphate | 0.45 |
| Whipping agent | 2.25 |
| Nonfat milk solids | 22.50 |

22. A method of producing an instant cold, neutral-type chiffon pie filling comprising: admixing approximately 4.25 ounces of the following materials with water in the amounts set forth by weight percent for each cup of water so employed:

| Sodium alginate (containing not more than 1.0% of calcium oxide) | 2.25 |
| --- | --- |
| Sodium hexametaphosphate | 0.45 |
| Whipping agent | 2.25 |
| Sodium chloride | 0.35 |
| Nonfat milk solids | 22.50 |
| Sugar | 72.20 |

23. A method of producing an instant cold, neutral-type chiffon pie filling by mixing approximately 81.25 grams of the following materials with water in the amounts set forth in parts by weight for each cup of water so employed:

| Sodium alginate (containing not more than 1.0% of calcium oxide) | 2.75 |
| --- | --- |
| Sodium hexametaphosphate | 0.30 |
| Calcium lactate | 0.20 |
| Whipping agent | 3.00 |
| Skim milk powder, instant | 25.00 |
| Sugar | 40.00 |
| Cocoa | 10.00 | whipping said mixture into said water for approximately one minute; adding approximately ⅓ cup of sugar; and whipping until peaks form.

24. A method of producing an instant cold, neutral-type chiffon pie filling comprising: admixing approximately 71 grams of the following materials with water in the amounts set forth in parts by weight for each cup of water so employed:

| Sodium alginate (containing not more than 1.0% of calcium oxide) | 2.75 |
| --- | --- |
| Sodium hexametaphosphate | 0.30 |
| Calcium lactate | 0.20 |
| Whipping agent | 2.50 |
| Skim milk powder, instant | 25.00 |
| Sugar | 40.00 |
| Vanillin | 0.25 | whipping said materials in said water for approximately one minute; adding approximately ⅓ of a cup of additional sugar; and whipping said mixture until peaks form.

25. A method of producing an instant cold, neutral-type chiffon pie filling comprising: admixing approximately 48.45 grams of the following materials with fresh milk in the amounts set forth in parts by weight for each cup of fresh milk so employed:

| | |
|---|---|
| Sodium alginate (containing not more than 1.0% of calcium oxide) | 2.50 |
| Trisodium phosphate | 0.75 |
| Calcium citrate | 2.00 |
| Sodium chloride | 0.40 |
| Vanillin | 0.30 |
| Whipping agent | 2.50 |
| Sugar | 40.00 | whipping said materials into said milk for approximately one minute; adding an additional ⅓ of a cup of sugar to said mix; and whipping said materials until peaks form.

References Cited in the file of this patent

UNITED STATES PATENTS

| | | |
|---|---|---|
| 2,441,729 | Steiner | May 18, 1948 |
| 2,558,419 | Sevall et al. | Mar. 11, 1952 |
| 2,808,337 | Gibsen | Oct. 1, 1957 |